(No Model.)
A. D. MYERS.
METHOD OF MAKING RAKES.
No. 353,803. Patented Dec. 7, 1886.
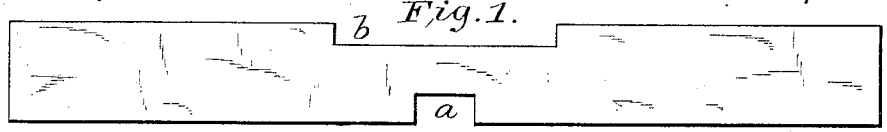
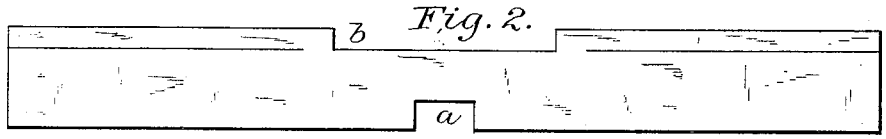
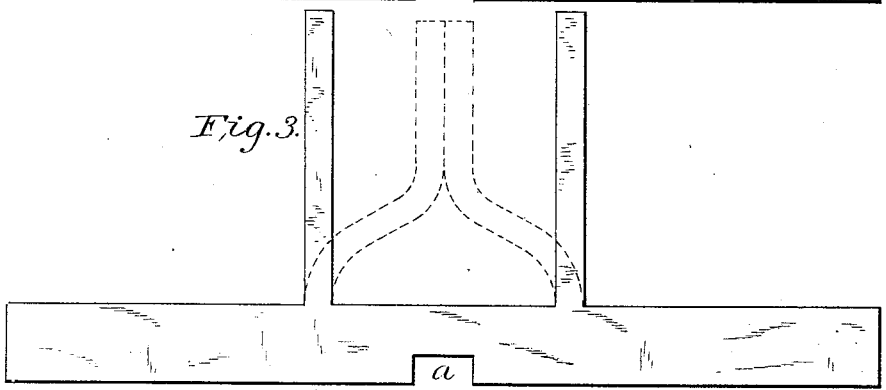
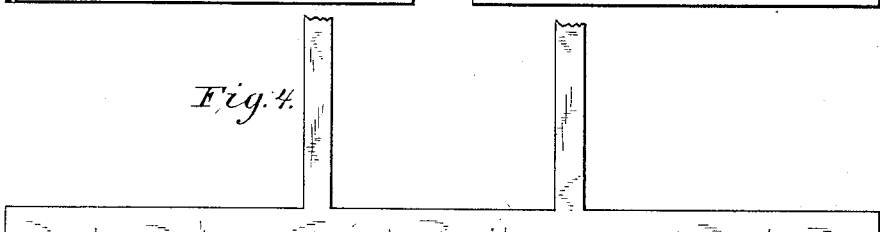
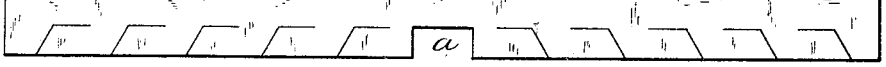
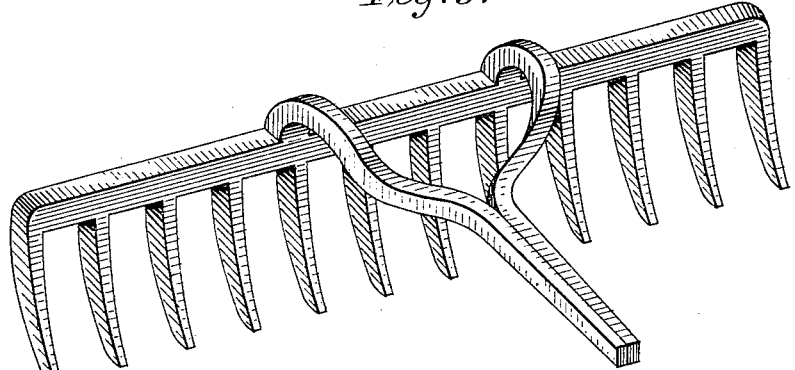
Witnesses
Jos. S. Latimer
Wm. H. Myers
Inventor
Addison D. Myers
By Attorney
D. B. Gallatin

UNITED STATES PATENT OFFICE.

ADDISON D. MYERS, OF GENEVA, OHIO.

METHOD OF MAKING RAKES.

SPECIFICATION forming part of Letters Patent No. 353,803, dated December 7, 1886.

Application filed July 23, 1886. Serial No. 208,852. (No model.)

*To all whom it may concern:*

Be it known that I, ADDISON D. MYERS, a citizen of the United States, residing at Geneva, in the county of Ashtabula and State of Ohio, have invented certain new and useful Improvements in Forged Metallic Hand-Rakes and Method of Making the Same; and I do hereby declare the following to be a full, clear, and exact description of the invention, such as will enable others skilled in the art to which it appertains to make and use the same.

My invention relates to forged metallic hand-rakes, which are especially designed for use as garden-rakes.

My object is to make a light, strong, and durable rake at reduced cost; and to this end my invention consists in the particular construction and in the method of fabrication, as will be hereinafter fully described, and specifically claimed.

In the accompanying drawings, which form a part of this specification, Figure 1 represents the blank from which the rake is formed. Fig. 2 represents the same after being sheared or cut to form the tang. Fig. 3 represents the sheared portions turned out or away from the body preparatory to drawing and bending. Fig. 4 represents the prepared blank of Fig. 3 after shearing or cutting for the teeth, and Fig. 5 represents the finished rake.

The figures of the drawings represent in their order the successive steps of the method which forms one part of my invention, and Fig. 5 represents the completed rake, which forms the other part.

The blank from which the rake is formed is cut from a plate of wrought metal, of a shape substantially as represented in Fig. 1, with notches or cut-away portions at the centers of the two sides, as shown at *a b*. The notch *a* is cut out to remove the metal between the two center teeth, and the notch *b* to remove the metal between the two arms of the tang. The blank having been prepared, as shown in Fig. 1, the next step in the operation is to cut or shear the metal required for the tang. This is done by cutting along one edge (that in which the notch *b* is cut) from both ends toward the notch *b*, stopping at a distance from said notch corresponding with the width of the strip sheared. These strips are then bent out from the body into the position substantially as shown in Fig. 3, after which they are drawn to the required length and finished by bending. The tang having thus been provided for, I next cut or shear the opposite edge from that on which the tang is formed, substantially as represented in Fig. 4. The metal so sheared is then turned out and drawn to form the teeth. The sheared metal on opposite sides of the notch *a* is turned toward the center, and the width of the notch *a* determines the distance between the two center teeth. The cuts for the other teeth are made at such distances as to correspond with the width of notch *a*, thus preserving uniformity of spacing. The teeth having been finished, I finish the rake by bending the tangs into proper shape. This is done by bringing the ends together and then bending both parts over into the form of a "goose-neck," when the rake is completed and ready for the application of the handle, which is put on in the usual way.

It is to be observed that the two arms of the tang are merely brought together and are not welded, welding being unnecessary according to my construction.

By cutting out the notches *a b*, I save the metal so cut out, which, if it were left, would only add to the weight of the finished rake without increasing its strength; also, I reduce the amount of drawing and forging to a minimum, thus materially lessening the cost of fabrication, while at the same time I produce a neater and better-finished article.

Having thus described my invention, what I claim as new, and desire to secure by Letters Patent, is—

1. The blank for a metallic rake herein described, consisting of a flat rectangular piece of metal with notches at the center of its opposite edges, substantially as shown and described.

2. The blanks for metallic rakes, consisting of a flat rectangular piece of metal, a notch, *b*, in one edge, and sheared or cut along that edge from opposite ends toward the notch, the cuts terminating near the latter, substantially as shown and described.

3. The method of constructing metallic hand-rakes herein described, which consists in first forming a blank with notches or cut-away portions at the centers of its opposite edges, then shearing the said blank from the two ends toward the center and near one edge, bending the sheared portions outward and forming therefrom the tang, then shearing the opposite edge for the teeth, substantially as shown and described, bending the sheared portions out, and forging the teeth, substantially as hereinbefore set forth.

In testimony whereof I affix my signature in presence of two witnesses.

ADDISON D. MYERS.

Witnesses:
A. B. MARTIN,
A. BERNDROTH.